Sept. 30, 1941.    A. S. CHANDLER    2,257,412
DISPENSING DEVICE
Original Filed Oct. 30, 1936    3 Sheets-Sheet 1
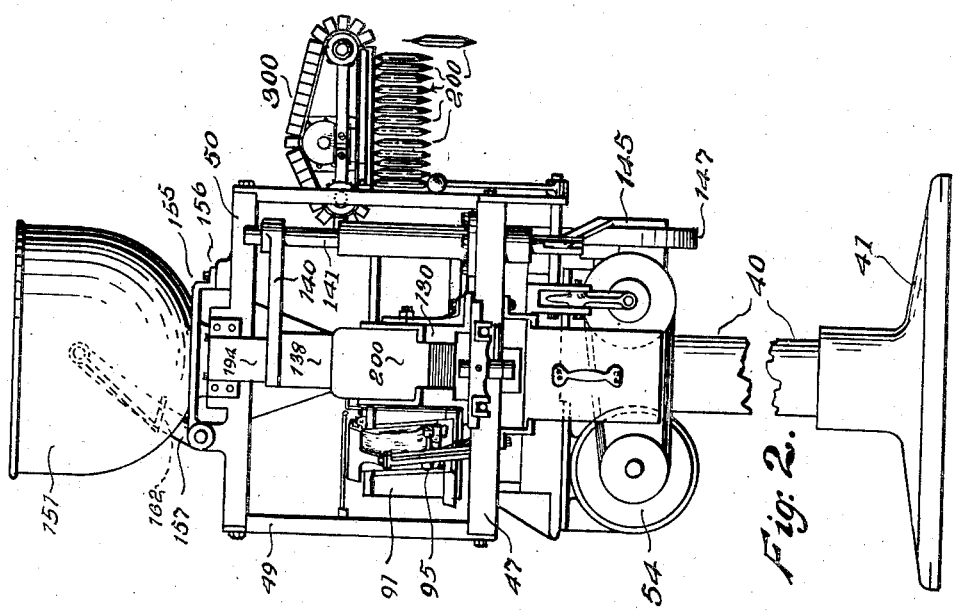
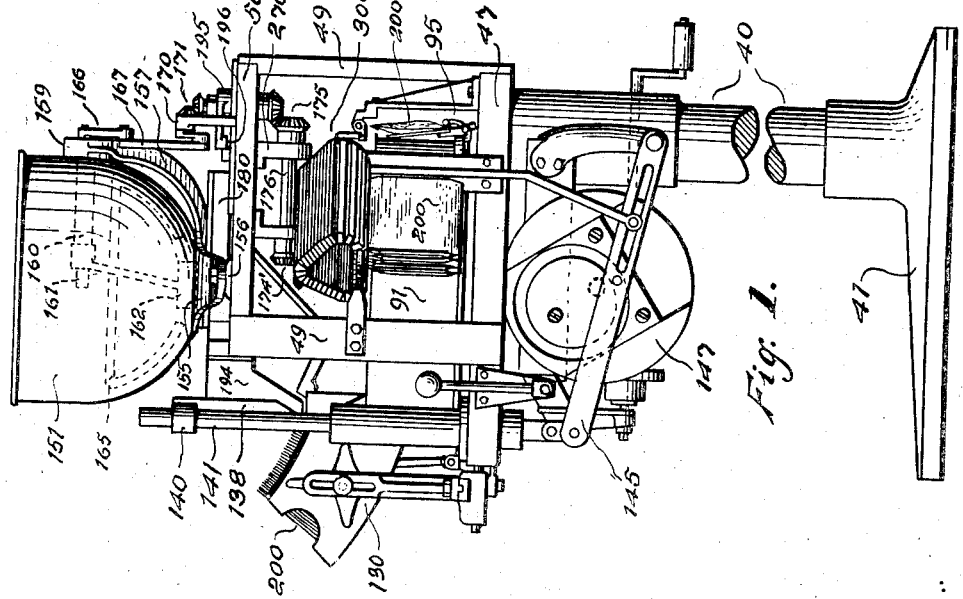
INVENTOR:
Austin S. Chandler,
BY:
Horace S Woodward
ATTORNEY.

Sept. 30, 1941.    A. S. CHANDLER    2,257,412
DISPENSING DEVICE
Original Filed Oct. 30, 1936    3 Sheets-Sheet 2

INVENTOR
Austin S. Chandler,
By Horace S. Woodward
ATTORNEY

Sept. 30, 1941.     A. S. CHANDLER     2,257,412
DISPENSING DEVICE
Original Filed Oct. 30, 1936     3 Sheets-Sheet 3

INVENTOR:
AUSTIN S. CHANDLER,
BY:
Horace J Woodward
ATTORNEY.

Patented Sept. 30, 1941

2,257,412

UNITED STATES PATENT OFFICE 2,257,412

DISPENSING DEVICE

Austin S. Chandler, Fitchburg, Mass., assignor to The Brown Bag Filling Machine Company, Fitchburg, Mass., a corporation of Massachusetts Original application October 30, 1936, Serial No. 108,487. Divided and this application January 26, 1939, Serial No. 253,021

16 Claims. (Cl. 221—105)

This application is a division of my copending application, Serial No. 108,487, filed October 30, 1936, for Bag filling machines.

The invention relates to improved hopper and measure construction especially useful in bag filling machines and otherwise.

It is an object of the invention to present a novel construction and mounting for the hopper and measuring devices. Another aim is to present a large capacity hopper which while being at about the height of the average attendant, may be filled and cleaned without the use of step-ladder or other elevated support.

Another object is to enable ready and immediate dumping of the hopper at any time without requiring disconnection of the operative parts, or dismounting of operative connections, and without the service of a mechanic, notwithstanding the use of a feed and agitator device in the hopper.

A special purpose is to provide a measure which will operate with a minimum of friction in guides and on the materials measured, to the end that heating by this element and damage to goods thereby is reduced to a minimum.

It is also an important aim to provide a feed in the hopper which will also operate to efficiently discharge the materials to the measure with a minimum of friction.

It is also an object to present a construction of hopper, agitator and measure specially adapted to mounting over a rotary conveyor with a minimum of operative mechanism within or laterally adjacent the conveyor.

Another aim is to provide a novel construction and coordinated action of an agitator and measure in the hopper.

A further important object is to enable the ready replacement of various parts of the hopper or measure without requiring dismounting of the other parts of the mechanism.

Additional objects, advantages and features of invention reside in the construction, arrangement and combination of parts involved in the embodiment of the invention, as will be understood from the following description and accompanying drawings, wherein Figure 1 is a side view of a complete bag filling machine embodying my invention.

Figure 2 is a front view thereof.

Figure 3:
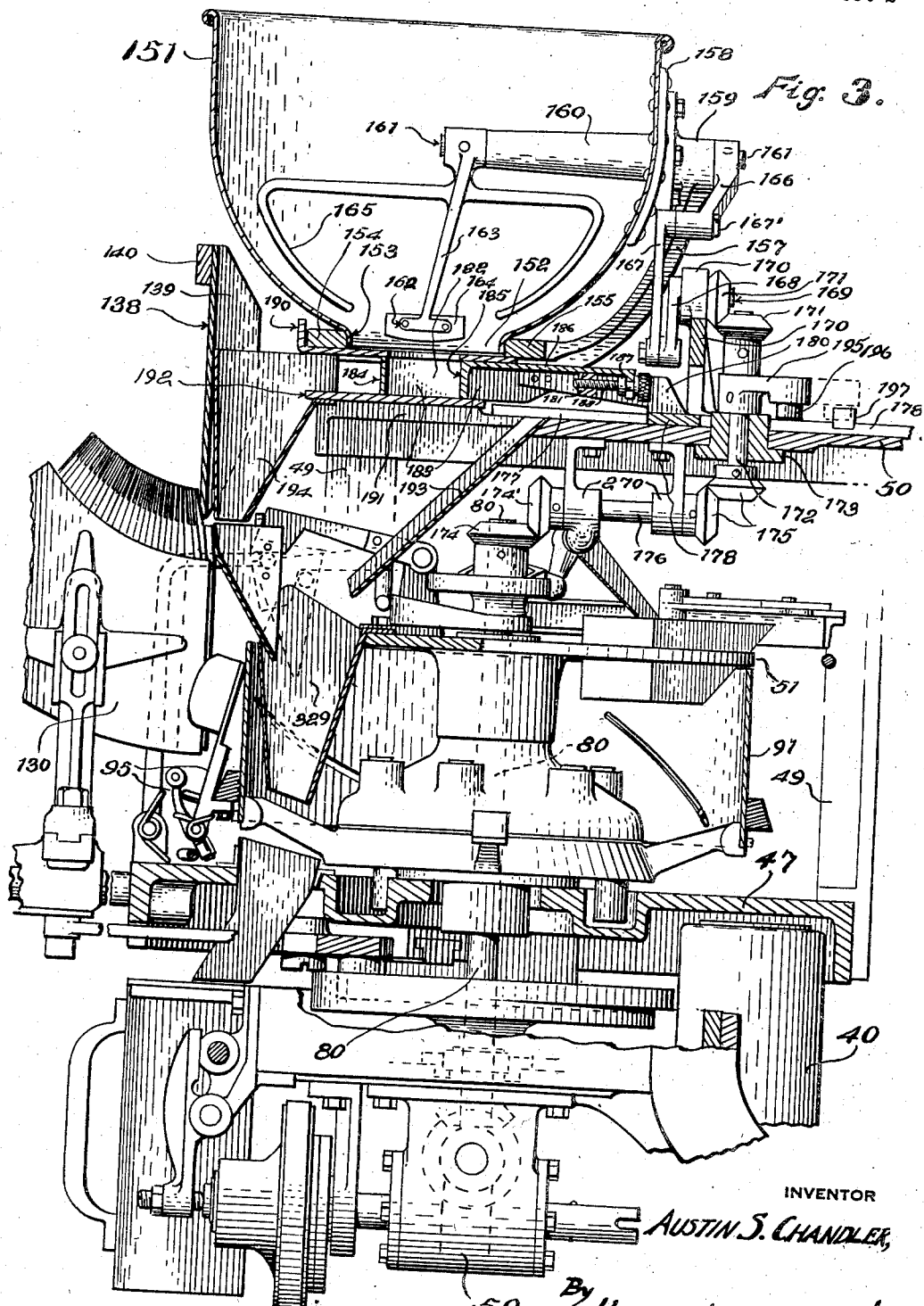
Figure 3 is a vertical section of the machine, in a fore-and-aft plane.

The machine illustrated comprises a stand 40 with a foot casting 41 carrying a frame-work which includes a table 47, on which there are erected a number of posts 49 carrying a platform 50 which serves for the mounting of the hopper and operative parts associated directly therewith. There is also provided a smaller circular top plate 51 below the platform, serving as a bed plate for certain operative parts of the bag-filling machine not forming part of this invention, and around which a conveyor 91—95 moves step-by-step, as set forth in my said prior application, the details thereof not forming a part of this invention. At the front of the machine a bag presenting device 130 is operative in association with the conveyor, and a bag opener 138 operated by arm 140 on a reciprocating rod 141, actuated by cam 147 and lever 145 is cooperative therewith at a filling station on the machine to open bags 200 in coordination with my machine. Through a gearing device 59 a vertical suitably mounted main shaft 80 is rotated concentrically within the conveyor, stopping a distance below the platform 50 and carrying on its upper end a bevel gear 174 meshed with a similar gear 174' fixed on a rearwardly extending horizontal countershaft 176 mounted in suitable brackets 270 secured to the under side of the platform 50. By means of bevel gears 175 the shaft 176 drives a vertical countershaft 172 suitably bushed as at 173 in the platform 50. The hopper and measure mechanism are operated by this shaft 172, as will be described.

Connections not forming a novel part of this invention, operative between the shaft 80 and the bag presenting means and bag opener cause these instrumentalities to present and open bags on carriers 95 of the conveyor at the filling station in succession at intervals corresponding to discharge operations of my present measure, as will appear.

Figure 4:
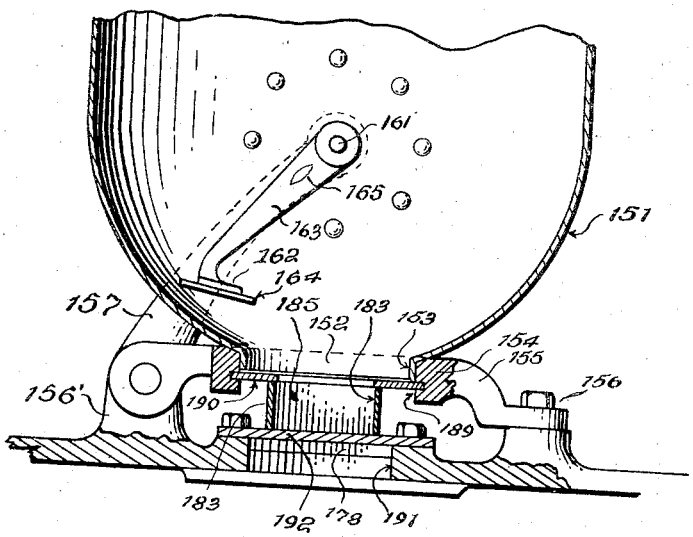
Figure 4 is a vertical cross section of the hopper and measure at right angles to Figure 3.
Figure 5:
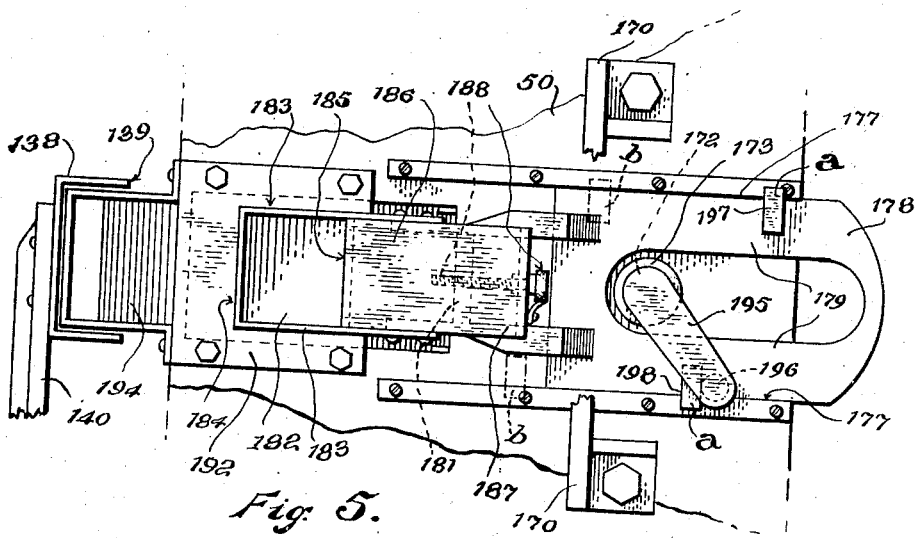
Figure 5 is a top view of the measure, its mounting and operative means, the hopper being removed.

A hopper 151 circular in plan is mounted over the platform 50, having a semi-spherical bottom terminating in a circular opening 152 with a short circumscribing, depending lip 153, set in a collar 154 forming part of a pivoted frame 155 pivoted at 156' on the platform 50, to the left of the hopper. The swinging end of the frame 155, as seen in Figure 1, is bolted detachably at 156 to an upstanding boss on the platform 50. It should be noted that in the present embodiment the vertical axis of the hopper is spaced forwardly from the axis of the index table and shaft 80, affording a shorter stroke for the measure to be described, and greater diameter for the hopper. The frame 155 includes a part extending integrally from the collar 154 to the left, and an arm 157 extending upward and curved toward the right beside and behind the hopper, where an opening is cut in the rear wall of the hopper, and a plate 158 on the upper end of the arm 157 is secured to the wall of the hopper at this opening. A bearing 159 is formed centrally of the plate, from which a bearing arm 160 extends horizontally into the hopper slightly below the geometrical center of the semi-spherical bottom. The arm 160 has revoluble therein an agitator shaft 161, to the inner end of which, short of the vertical axis of the hopper, there is secured a sweep 162 consisting of a central arm 163 extending diagonally to swing in an arc clearing the sides of the opening 152 and in a plane coincident with the vertical axis of the hopper, where an inclined paddle or vane 164 is attached, having an inclination from its lower edge upwardly toward the right in Figure 4, so that when the sweep moves in this direction the material engaged by the vane will be pressed or packed downwardly in the opening 152. In addition, the sweep includes horizontal extensions spaced below the arm 160, and from the extremities of these curved agitator arms 165 are extended downwardly so as to be spaced a short distance from the adjacent surfaces of the bottom at all times. With the hopper filled with pulverulent material or granular material, the movement of this sweep over a short radius will keep the stock in a flowing state, and cause it to readily feed into the mouth of the hopper beneath the vane 164.

On the outer end of the shaft 161 there is fixed a crank arm 166 to which a link 167 is connected detachably by a removable pin 167', and pivoted on an eccentric 168 of a short horizontal shaft 169 mounted in a bracket bearing 170 which forms a bridge over a measure slide and a measure operating crank arm, to be described. The shaft 169 is driven by 1-to-1 bevel gears 171 from the vertical countershaft 172.

The platform 50 has a rearwardly extending guide channel 177 formed or constructed on its upper side in the medial line of which the bearing 172 is mounted, and reciprocable in the channel there is a measure slide 178 which is in the form of two parallel side bars 179 spaced apart to move freely on each side of the bearing bushing 173 and connected at their forward and rear ends. Each has a narrow upwardly offset forward extension 180 and between these two extensions there extends a cross bar 181. To these extensions the side walls of a measure box 182 are riveted. The box consists of two side walls 183 and a front wall 184 formed from a strip of sheet metal bent at right angles at the lateral limits of the front wall 184, substantially in a U-shape. Snugly slidable between the side walls of the box there is a back wall 185 having a planiform top plate rearward extension 186 flush with the top edges of the box, and provided with a downward extension 187 at its rear extremity, in which an adjusting screw 188 is swivelled, threaded in the cross bar 181, by which the rear wall may be adjusted to vary the capacity of the measure. The top of the box is spaced a distance below the lip 153 of the hopper and in the lower side of the hopper collar 154 there is formed a fore-and-aft channel 189 (Figure 4) much wider than the measure box, and having opposed horizontal grooves in its sides immediately below the lip of the hopper, or at least at the plane where the opening from the hopper through the collar terminates. In the grooves there is set slidably a removable planiform discharge plate 190 serving as the bottom of the hopper and having a rectangular opening or port therethrough of a width slightly less than that of the measure box, and having its forward edge positioned to aline with the wall 184 when the measure is retracted to loading position, as in Figure 3, while the rear edge of the opening may be located to aline with the rear wall of the measure at the same time, if the measure is enlarged to its full capacity by rearward adjustment of the wall 185. The lower edges of the measure are slightly above the top level of the platform 50, and adjacent the mouth of the hopper the platform is formed with a slot 191 of a width somewhat less than that of the channel 189, and extending forwardly from a point rearwardly of the discharge plate 190 and opening through the front edge of the platform, which front edge is set back from that of the table 47. Along each side of this slot 191 the platform 50 has slightly raised bosses on which a measure bottom plate 192 is secured, fitting snugly the lower edges of the measure when the latter is set properly in close relation to the discharge plate 190. This bottom plate stops short of the rear end of the slot 191, so that material leaking or working out from the measure may drop over its rear edge when pushed back by the wall 185 on retraction, and a fender plate 193 is mounted thereunder, to catch such material, its rear edge being flush with the platform at the rear end of the slot 191, the plate being inclined downwardly and forwardly over and beyond the gears 174, so as to permit waste material to slide on the plate and drop into a waste chute 329 associated with a trap 328 described in my said prior application. The manner of mounting the bottom plate facilitates its dissipation of heat, and the measure being free of guide walls at the side is likewise free of heating tendencies found in many prior machines from that cause. Its thin walls and the open structure of the connection between the measure and the slide contribute to rapid dissipation of heat into the air.

In this way also the accumulation of waste stock within the machine is minimized, and wear and damage of the operative parts by access of such material also reduced to a notable minimum.

Secured to the front edge of the platform 50 in line with the measure there is a tunnel device 194 of sheet metal, rectangular in cross section, its rear wall being cut away at the upper part and extended slightly under the bottom plate 192, its side walls receiving therebetween the measure when moved to its forward limit. The opening in the tunnel is adapted to accommodate the maximum fore-and-aft dimension of the measure, and its rear wall is inclined forwardly and downwardly so that its end will lie close above and forwardly of the rear wall of a bag when the opener is engaged therein. The tunnel lies between the side flanges 139 of the opener at all times so that any material dropping from the measure into the tunnel will be guided into the bag.

The measure is operated by means of an arm 195 fixed on the shaft 172, spaced above and swinging over the slide 178. On the extremity of the arm a depending hardened wiper pin 196 is mounted, lying very closely over the slide at respective limits of the orbit of the pin. The slide is provided with respective strike blocks 197 and 198, on the left and right side bars of the slide as viewed from the front, the one located further to the rear than the other on the slide, and the inner ends of these blocks are also spaced from the medial vertical plane of the slide so that the pin 196 will engage one and after moving the slide to one limit will clear the block and swing over a substantial arc before engaging the other block and returning the slide to the opposite limit of its movement. Thus, the measure is given a considerable period of rest both at loading and in discharge positions, although the loading begins before it reaches this rest position and continues as it departs toward discharge position, and discharge begins before the full advanced position is attained as well as continuing in its initial return movement. The distance from the forward edge of the discharge opening in the discharge plate to the front edge of the bottom plate is such that the measure is closed under the hopper before it projects over the edge of the bottom plate when the measure is adjusted to its largest size, which obviates the possibility of an excess charge being delivered in case of slow motion of the machine.

The rotation of the arm 195 may be timed so that it engages the block 198 and begins to move the measure while the opener is being lowered into the bag, and the front wall of the measure may pass beyond the bottom plate 192 before the opener is fully lowered, as the bag will have been opened to the maximum before the opener is fully lowered. And the retraction of the measure may begin before the opener begins to rise.

The sweep in the hopper is also timed to swing in the direction of its upward inclination while the measure is at the loading position beneath the opening of the discharge plate, preferably passing partly or completely over the opening before the measure starts forward.

To gain access to the discharge opening of the hopper, the machine may be stopped with the eccentric 168 located toward the arm 157 on a nearly or quite horizontal radius of the shaft 169, and the bolt or other fastening at 156 removed. The length of the link 167, arm 166 and radius of the eccentric 168 are such that the hopper may now be tilted toward the left until its symmetrical axis is but little inclined above the horizontal. As the hopper is so moved with the mechanism otherwise stationary, the sweep 162 is caused by the link 167 to swing relatively in the hopper to a position extended outwardly at the open top of the hopper, leaving ample space for the insertion of the hand of the operator to the discharge opening of the hopper. Any remaining content may be drawn over the lip of the hopper readily by hand. In case it is desired to incline the hopper further, the pin 167' may be removed, permitting the hopper to be moved until it is inclined downwardly toward the top end. This permits ready working and drainage of the interior without liability of wetting the measure or machinery.

In the operation of the machine in which this invention is embodied, the main vertical shaft 80, the countershaft 172, and shaft 179 rotate in unison. The bag presenting mechanism of the machine also presents the bags in synchrony with this motion and retains the presented bags in position during a part of the intermission of motion of the rotary conveyor 91—95, the opener 138 operating during this intermission.

I claim:

1. In a machine of the character described, a material measuring device comprising a reciprocating open measure, a hopper mounted thereover having a rectilinear discharge plate apertured to register with the measure at one position and normally having the measure in close slidable and separable relation thereto, a support for the hopper comprising a frame having a pivotal mounting a distance from the discharge plate aperture constructed so that said hopper may swing upwardly and laterally to a tilted position, a shaft mounted revolubly in the hopper, an agitator sweep fixed thereon within the hopper to swing in spaced relation to the discharge plate, an operating arm fixed on the shaft without the hopper and having movement above and below a mean normal radius, a counter shaft revolubly mounted on a fixed axis, a crank thereon of shorter radius than the arm and a link connected between the crank and the operating arm, the arm and crank being adapted to extend in the mean direction of the location of the first shaft when the hopper is tilted, and having an aggregate length at least equal to the distance from the counter shaft to the full limit of movement of the shaft on said pivotal mounting, and means to secure the hopper in normal operative position.

2. An anti-heating measuring device for machines of the character described comprising a frame, a fixed bottom plate thereon, a measure comprising a box-like element having an open top and an open bottom and having thin walls set flush and slidably on the bottom plate, means to reciprocate the measure between a loading position upon said plate and a discharge position projected beyond an edge of the plate in one direction, a hopper over said bottom plate formed with a throat having downwardly extending portions formed with a large opening therethrough, opposite opposed parallel grooves being formed in the sides of said opening said grooves being in a plane parallel to the direction of movement of the measure and being open on their ends in at least one direction, and a ported discharge plate slidably engaged in the grooves for removal, the port in said discharge plate being positioned to aline with the measure at loading position of the latter, the top of the measure being closely and slidably fitted to the under face of the discharge plate.

3. The structure of claim 2 in which said bottom plate terminates in the direction of retraction of the measure close to the inner side of the measure when in retracted or loading position, and means to catch stock waste from the last named edge of the bottom plate.

4. A measuring device comprising a body having a guide channel, a vertical shaft revoluble therein spaced from the sides of the channel, a slide reciprocable in the channel open around the shaft, a crank on the shaft over the slide, a block mounted on each side of the slide each spaced longitudinally of the slide from a medial transverse line in the direction of movement of the crank there adjacent, the blocks being spaced from a medial longitudinal line so that when engaged by the crank, the crank will clear the block while the crank is at an angle to the line of travel of the slide, each of said blocks extending laterally beyond the radius of the crank, and being spaced longitudinally from each other less than the arrow of the crank whereby when one is engaged and moved in one direction, the other will be brought within the radius of the crank, said slide having a forward extension, a measure on the extension, and means to deliver stock to the measure at one position.

5. The structure of claim 4 in which said extension of the slide has fixed side walls of the measure and one outer end wall, a transverse bar inwardly of the measure, an inner end wall of the measure slidable between the side walls, and having a horizontal top plate extension flush with the top edges of the side walls, a screw engaged through said bar and in the extension, threaded in one and swivelled in the other, whereby the inner wall is longitudinally adjustable.

6. The structure of claim 4 in which a hopper is mounted over the loading position of the measure, a shaft revolubly mounted therein, a sweep on the shaft movable across the lower part of the hopper over the discharge aperture, operative connections between the shafts, means to rock the shaft over an arc to swing the sweep across the discharge aperture and in a relation to the crank to advance across the discharge aperture while the measure is in loading position, the sweep including a vane inclined upward in the direction of the last named movement.

7. The structure of claim 4 in which a hopper is mounted over the loading position of the measure, a shaft revolubly mounted therein, a sweep on the shaft movable across the lower part of the hopper over the discharge aperture, an arm on the shaft without the hopper, a bracket bridging the slide, a horizontal shaft thereon, a bevel gear connection between the vertical and horizontal shafts, a crank on the horizontal shaft, and a link connecting the last named crank and said arm.

8. A hopper and mounting therefor in machines of the character described comprising an open hopper receptacle having sloping lower side portions terminating in a lip forming a large mouth opening therethrough, a mounting frame including a collar receiving the lip therein and having a horizontal channel across the lower side below the lip, a removable discharge plate slidable in the channel forming the bottom of the hopper and apertured to discharge contents of the hopper, a support, said frame being pivoted thereon a distance outwardly of the lower part of the hopper, said frame having a swinging part opposite the pivot engaging the support, and means to fasten said swinging part to the support.

9. The structure of claim 8 in which an arm is pivoted on the same axis as said frame and extended diagonally upward beside the hopper, a shaft parallel to the pivot axis journalled in the upper part of the arm and projecting into the hopper, an agitator thereon within the hopper, a shaft horizontally revoluble on the support below the last named shaft, a crank thereon, an arm on the first named shaft and link connections between the crank and arm.

10. A measuring device comprising a hopper having a discharge opening at the lower side thereof, a measure mounted to reciprocate thereunder in receiving relation, and movable to a discharge position, means to reciprocate the measure, a sweep device mounted in the hopper having a member movable across said opening formed with an inclined face presented downwardly at such angle as to press stock downwardly when advanced over the opening, and means to operate the sweep with the same period as the measure, whereby when the measure is under said opening the sweep will be moved over the opening with said inclined face advancing.

11. An anti-heating measuring mechanism for machines of the class described, comprising a frame, a fixed planiform bottom plate thereon, a measure comprising a box-like element having an open top and having thin walls at all sides, set flush and slidably on the plate, means to reciprocate the measure between a loading position upon said plate and a discharge position projected beyond the plate in one direction consisting of a reciprocable member and guide means therefor distant from the measure and a connection of relatively small cross sectional dimension between the reciprocable member and measure to guide and support the measure in the path indicated, a hopper having a planiform discharge plate apertured to aline with the measure at loading position, the top of the measure closely and slidably fitting the under face of the discharge plate, and means to operate the reciprocable member.

12. In a measuring device of the class described, a horizontal measure guide having a bottom plate, a measure comprising a box-like element having an open top and bottom and set on the plate, means to reciprocate the measure on the plate between a loading position and a distant discharge position, a hopper having a discharge opening at the lower side and normally positioned with said opening alined with the loading position of the measure, the measure being constructed to fit slidably to said opening, and a pivotal mounting for the hopper having a pivot axis displaced laterally from the path of the measure constructed so that the hopper may be swung on the pivot to a tilted position and the measure exposed for cleaning or removal, and access given to the interior of the hopper from one side.

13. The structure of claim 12 in which said mounting is pivoted on an axis parallel to and distant from the path of the measure, the hopper being formed with a large open throat having opposite, parallel, grooved, downward extensions, and having a planiform lower face on a level next to the plane of the grooves and a ported discharge plate slidable in the grooves for removal and forming the bottom of the hopper, said ported plate parallel to said bottom plate.

14. In a measuring device of the class described, a measure comprising a box-like element having an open top and being otherwise constructed to discharge its contents when moved to a discharge position, means to move the measure in a fixed path from a loading position to a discharge position repeatedly, a hopper having a discharge opening at the lower side normally positioned and shaped to aline in close relation with the measure when at loading position, the measure being constructed to fit slidably to said opening, and a pivotal mounting for the hopper having a pivot axle displaced laterally from the path of the measure constructed so that the hopper may be swung on the pivot to a tilted position and the measure exposed for cleaning or removal, and access given to the interior of the hopper from one side.

15. A measuring mechanism comprising means to deliver material to be measured, including an apertured discharge plate forming a bottom element thereof, a bottom plate separated from and spaced below said discharge plate in parallel relation thereto, a measure comprising a box open at top and bottom and having its top and bottom edges fitted slidably to respective adjacent surfaces of said discharge plate and said bottom plate, said surfaces and the space between said plates extending from the sides of the box a substantial distance in all directions whereby the box is clear of confinement at the sides and whereby air may circulate freely thereabout, means to support the bottom plate located below the latter, means to reciprocate the box beyond the bottom plate in one direction and return, said box having a top plate extension shaped to lie closely and slidably against the discharge plate to close the aperture through the discharge plate when the measure is in discharge position, and means distant from the measure to guide the measure in its reciprocation, including a guide arranged in the direction of reciprocation of the measure, part of the means to reciprocate the box being rigidly attached to the box and engaged in the guide.

16. A hopper and mounting therefor in machines of the character described, comprising a support, a hopper receptacle having a lower discharge opening, a mounting for the hopper including a pivot for the hopper on the support at a distance horizontally outward of the lower part of the hopper, means to secure the hopper on the support in operative position releasably for tilting of the hopper at times, a rock shaft journalled in the upper part of the hopper parallel to the pivot axis, an agitator on the shaft within the hopper, a shaft revoluble on the support below the last named shaft, a crank on the second named shaft, an arm on the first named shaft exteriorly of the hopper, and link connections between the crank and arm.

AUSTIN S. CHANDLER.